(12) United States Patent
Nakashio et al.

(10) Patent No.: US 10,210,892 B2
(45) Date of Patent: Feb. 19, 2019

(54) MAGNETIC RECORDING MEDIUM HAVING A PROTECTIVE LAYER

(71) Applicant: Sony Corporation, Tokyo (JP)

(72) Inventors: Eiji Nakashio, Miyagi (JP); Minoru Yamaga, Tokyo (JP); Jun Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/561,397

(22) PCT Filed: Feb. 8, 2016

(86) PCT No.: PCT/JP2016/000631
§ 371 (c)(1),
(2) Date: Sep. 25, 2017

(87) PCT Pub. No.: WO2016/157681
PCT Pub. Date: Oct. 6, 2016

(65) Prior Publication Data
US 2018/0108375 A1    Apr. 19, 2018

(30) Foreign Application Priority Data

Mar. 31, 2015    (JP) .................................. 2015-072254

(51) Int. Cl.
*G11C 19/08* (2006.01)
*G11B 5/706* (2006.01)
(Continued)

(52) U.S. Cl.
CPC .......... *G11B 5/584* (2013.01); *G11B 5/70615* (2013.01); *G11B 5/70621* (2013.01);
(Continued)

(58) Field of Classification Search
CPC ...... G03G 7/002; G03G 7/0053; G03G 7/006; G03G 7/0093; G03G 7/0013;
(Continued)

(56) References Cited

U.S. PATENT DOCUMENTS 6,846,555 B2 * 1/2005 Meguro ............... G11B 5/7026
428/323
6,964,811 B2 * 11/2005 Kishimoto ............. B82Y 25/00
428/402
(Continued)

FOREIGN PATENT DOCUMENTS

JP    2002-304720 A    10/2002
JP    2002-304721 A    10/2002
(Continued)

OTHER PUBLICATIONS

International Search Report (with English translation) dated Apr. 26, 2016 in corresponding international application No. PCT/JP2016/000631 (4 pages).
(Continued)

*Primary Examiner* — Gene Auduong
(74) *Attorney, Agent, or Firm* — K&L Gates LLP

(57) ABSTRACT

A magnetic recording medium includes a support, a recording layer, and a protective layer provided on at least one surface of the support and containing plate-shaped particle powder. The plate-shaped particle powder is stacked in an overlapping manner in a thickness direction of the protective layer such that main surfaces of plate-shaped particles face a surface of the support, and the plate-shaped particles have an average plate ratio of 60 or more.

10 Claims, 1 Drawing Sheet

(51) Int. Cl.
G11B 5/584 (2006.01)
G11B 5/712 (2006.01)
G11B 5/714 (2006.01)
G11B 5/738 (2006.01)
H01F 1/00 (2006.01)
H01F 1/055 (2006.01)
H01F 1/059 (2006.01)
G11B 5/72 (2006.01)
G11B 5/735 (2006.01)

(52) U.S. Cl.
CPC .............. *G11B 5/712* (2013.01); *G11B 5/714* (2013.01); *G11B 5/72* (2013.01); *G11B 5/735* (2013.01); *G11B 5/738* (2013.01); *H01F 1/0054* (2013.01); *H01F 1/059* (2013.01); *H01F 1/0551* (2013.01)

(58) Field of Classification Search
CPC .... G03G 7/0026; G03G 7/004; H01F 1/0063; G11B 5/70; G11B 5/584; G11B 5/738; G11B 5/735; G11B 5/725; G11B 5/7026
USPC ...... 365/8; 428/195.1, 201, 210, 211.1, 216, 428/323, 329, 839.3, 842.6
See application file for complete search history.

(56) References Cited

U.S. PATENT DOCUMENTS

| | | | |
|---|---|---|---|
| 7,267,896 B2* | 9/2007 | Kuse | B82Y 25/00 428/839.3 |
| 7,820,272 B2* | 10/2010 | Torikoshi | G03G 7/0013 399/127 |
| 2001/0044036 A1* | 11/2001 | Hayashi | G11B 5/735 428/837 |
| 2003/0224213 A1* | 12/2003 | Meguro | G11B 5/7026 428/840.1 |
| 2004/0089564 A1* | 5/2004 | Kuse | B82Y 25/00 206/307 |
| 2011/0045319 A1* | 2/2011 | Hayakawa | G11B 5/8408 428/840 |

FOREIGN PATENT DOCUMENTS

JP 2004-005890 A 1/2004
WO 2003/079333 A1 9/2003

OTHER PUBLICATIONS

Written Opinion dated Apr. 26, 2016 in corresponding international application No. PCT/JP2016/000631 (4 pages).

* cited by examiner

MAGNETIC RECORDING MEDIUM HAVING A PROTECTIVE LAYER

CROSS-REFERENCE TO RELATED APPLICATIONS

The present application claims the benefit of International Application No. PCT/JP2016/000631, filed Feb. 8, 2016, which claims priority to Japanese Application No. 2015-072254, filed Mar. 31, 2015, the disclosures of which are incorporated herein by reference.

BACKGROUND

The present technology relates to a magnetic recording medium. Specifically, the present technology relates to a magnetic recording medium including a support and a recording layer.

Recently, due to development of information technology (IT) society, electronization of libraries, archives, and the like, and long-term storage of business documents, demand for a higher recording density of a magnetic recording medium as a medium for data storage has increased.

In a high recording density magnetic recording medium, it is particularly desired to improve dimensional stability against humidity change and tension. For example, Patent Documents 1 and 2 describe that, in order to improve dimensional stability against humidity change, a reinforcing layer made of a material selected from a metal, a semimetal, an alloy thereof, an oxide thereof, and a composite thereof is formed on at least one main surface of a nonmagnetic support.

CITATION LIST

Patent Document

Patent Document 1: Japanese Patent Application Laid-Open No. 2002-304720
Patent Document 2: Japanese Patent Application Laid-Open No. 2002-304721

SUMMARY

Problems to be Solved by the Invention

An object of the present technology is to provide a magnetic recording medium capable of improving dimensional stability against humidity change and tension.

Solutions to Problems

In order to solve the above problems, the present technology is a magnetic recording medium including a support, a recording layer, and a protective layer provided on at least one surface of the support and containing plate-shaped particle powder, in which the plate-shaped particle powder is stacked in an overlapping manner in a thickness direction of the protective layer such that main surfaces of plate-shaped particles face a surface of the support, and the plate-shaped particles have an average plate ratio of 60 or more.

Effects of the Invention

As described above, according to the present technology, dimensional stability of a magnetic recording medium against humidity change and tension can be improved.

DETAILED DESCRIPTION

An embodiment of the present technology will be described in the following order.
1. Configuration of magnetic recording medium
2. Method for manufacturing magnetic recording medium
3. Effect
4. Modification Example

[1. Configuration of Magnetic Recording Medium]

Figure 1:
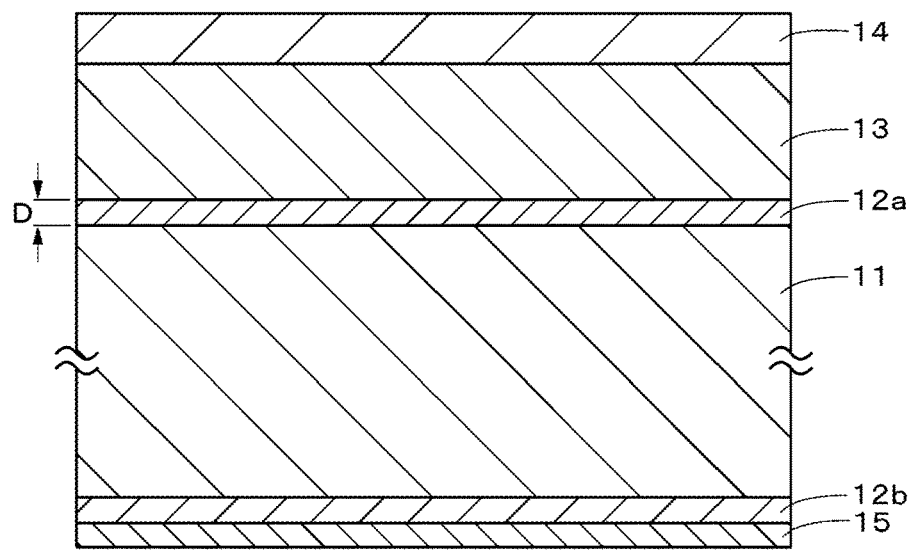
FIG. 1 is a schematic cross section illustrating an example of a configuration of a magnetic recording medium according to an embodiment of the present technology.

As illustrated in FIG. 1, a magnetic recording medium according to an embodiment of the present technology is a so-called application type perpendicular magnetic recording medium, and includes a nonmagnetic support 11, a protective layer 12a provided on one main surface of the nonmagnetic support 11, a base layer 13 provided on the protective layer 12a, a recording layer 14 provided on the base layer 13, a protective layer 12b provided on the other main surface of the nonmagnetic support 11, and a back coat layer 15 provided on the protective layer 12b. The magnetic recording medium may further include a surface protective layer, a lubricant layer, and the like provided on the recording layer 14, if necessary.

The present technology is suitably applied to a magnetic recording medium in which the average thickness of the recording layer 14 is 100 nm or less and the thickness of the whole medium is 6 μm or less. This is because improvement in dimensional stability against humidity change and tension is particularly desired in such a magnetic recording medium.

The magnetic recording medium according to the embodiment of the present technology has a strip shape. Here, the longitudinal direction of the magnetic recording medium may be referred to as a machine direction (MD), and the width direction of the magnetic recording medium may be referred to as a transverse direction (TD).

(Nonmagnetic Support)

The nonmagnetic support 11 is, for example, a strip-shaped film having flexibility. Examples of a material of the nonmagnetic support 11 include polyesters such as polyethylene terephthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyimide, and polyamideimide, light metals such as an aluminum alloy and a titanium alloy, and ceramics such as alumina glass. Furthermore, in order to enhance mechanical strength, a thin film containing an oxide of Al or Cu may be provided on at least one of main surfaces of the nonmagnetic support 11 containing a vinyl resin or the like.

(Protective Layer)

The protective layers 12a and 12b are films having low water vapor transmittance so as to hardly transmit moisture to reach the nonmagnetic support 11 and capable of reducing the amount of deformation of the magnetic recording medium against tension. The protective layers 12a and 12b contain plate-shaped particle powder and a binder. The protective layers 12a and 12b may further contain various additives such as particle powder having a shape other than the plate-shaped particles, a pigment, conductive particles, a curing agent, and a rust inhibitor, if necessary.

The shape of each of the plate-shaped particles is not particularly limited, and may be a substantially polygonal plate shape (for example, a substantially triangular plate shape, a substantially quadrangular plate shape, a substantially hexagonal plate shape, or the like), a substantially elliptical plate shape, a substantially disk shape, an irregular plate shape, or the like. Herein, the plate shape includes a scaly shape. The structure of each of the plate-shaped particles is not particularly limited, and a coating layer may be provided on at least a part of a surface of each of the plate-shaped particles.

The plate-shaped particle powder contained in the protective layer 12a is stacked in an overlapping manner in a thickness direction of the protective layer 12a such that main surfaces of plate-shaped particles face one main surface of the nonmagnetic support 11. That is, the plate-shaped particle powder is oriented such that a short axis of the plate-shaped particle powder contained in the protective layer 12a is substantially parallel to the thickness direction of the protective layer 12a. In addition, the plate-shaped particle powder contained in the protective layer 12b is stacked in an overlapping manner in the thickness direction of the protective layer 12b such that main surfaces of the plate-shaped particles face the other main surface of the nonmagnetic support 11. That is, the plate-shaped particle powder is oriented such that the short axis of the plate-shaped particle powder contained in the protective layer 12b is substantially parallel to the thickness direction of the protective layer 12b. The plate-shaped particle powder is preferably stacked in an overlapping manner in almost the whole range from one main surface of each of the protective layers 12a and 12b to the other main surface thereof from a viewpoint of improving dimensional stability of the magnetic recording medium against humidity change and tension. However, even in a case where the plate-shaped particle powder is stacked in an overlapping manner in a part of the range from one main surface of each of the protective layers 12a and 12b to the other main surface thereof, an effect of dimensional stability can be obtained.

The plate-shaped particles include, for example, organic particles, inorganic particles, or organic-inorganic hybrid particles. Specifically, the plate-shaped particles are, for example, made of at least one of clay and ferrite. The kind of the plate-shaped particles contained in the protective layers 12a and 12b may be one kind or more kinds. Furthermore, the type of the plate-shaped particles contained in the protective layer 12a may be different from the type of the plate-shaped particles contained in the protective layer 12b.

The clay contains, for example, at least one selected from the group consisting of kaolinite, dickite, halloysite, chrysotile, lizardide, amesite, pyrophyllite, talc, montmorillonite, beidellite, nontronite, stevensite, saponite, hectorite, sauconite, dioctahedral vermiculite, trioctahedral vermiculite, muscovite, paragonite, illite, sericite, phlogopite, biotite, lepidolite, magadiite, irilite, and kanemite.

The ferrite contains, for example, at least one selected from the group consisting of barium ferrite, strontium ferrite, lead ferrite, calcium ferrite, and α-iron oxide.

An average thickness Dm of each of the protective layers 12a and 12b is preferably 30 nm or more and 500 nm or less, more preferably 100 nm or more and 500 nm or less, still more preferably 150 nm or more and 500 nm or less, and particularly preferably 200 nm or more and 500 nm or less. The average thickness Dm of 30 nm or more can further improve dimensional stability of the magnetic recording medium against humidity change and tension. On the other hand, the average thickness Dm of 500 nm or less can reduce the total thickness of the magnetic recording medium.

The average thickness Dm of the protective layer 12a is determined as follows. First, the magnetic recording medium is cut perpendicularly to a main surface thereof, and a cross section thereof is observed with a transmission electron microscope (TEM). Subsequently, 10 points are randomly picked up from the observed TEM image, and a thickness D of the protective layer 12a is measured at each of the points. Subsequently, by simply averaging (arithmetically averaging) these measured values D's, the average thickness Dm of the protective layer 12a is determined.

Measurement conditions of TEM are illustrated below.

Apparatus: TEM (H9000 NAR, manufactured by Hitachi, Ltd.)

Acceleration voltage: 300 kV

Magnification: 100000 times

Note that the average thickness of the protective layer 12b is also determined in a similar manner to the above method for determining the average thickness Dm of the protective layer 12a.

The plate-shaped particles are, for example, plate-shaped nanoparticles. Herein, the plate-shaped nanoparticles are those having an average plate thickness Tm of 1 nm or more and 100 nm or less. The average plate thickness Tm of the plate-shaped particles is preferably 1 nm or more and 50 nm or less, more preferably 1 nm or more and 10 nm or less, still more preferably 1 nm or more and 8 nm or less, and particularly preferably 1 nm or more and 5 nm or less.

The average plate ratio (Rm/Tm) of the plate-shaped particles is 60 or more, preferably 60 or more and 1000 or less, and more preferably 200 or more and 1000 or less. The average plate ratio (Rm/Tm) of 60 or more can improve dimensional stability of the magnetic recording medium against humidity change and tension. On the other hand, the average plate ratio (Rm/Tm) of 1000 or less makes handling of the plate-shaped particle powder easy.

Figure 2:
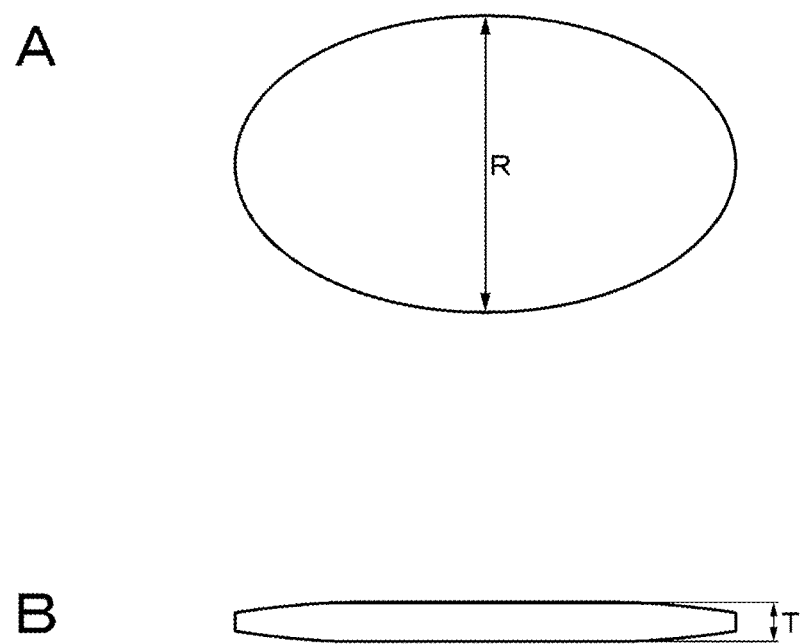
FIG. 2A is a schematic diagram for explaining a plate diameter of each of plate-shaped particles.
FIG. 2B is a schematic diagram for explaining a plate thickness of each of the plate-shaped particles.

As illustrated in FIG. 2A, a plate diameter R of each of the plate-shaped particles means a minimum diameter length (minimum diameter) of a main surface of each of the plate-shaped particles. On the other hand, as illustrated in FIG. 2B, a plate thickness T of each of the plate-shaped particles means a maximum thickness of a side surface of each of the plate-shaped particles. A plate thickness ratio of each of the plate-shaped particles is a ratio (R/T) of the plate diameter R of each of the plate-shaped particles to the plate thickness T of each of the plate-shaped particles.

The average plate thickness Tm of the plate-shaped particles is determined as follows. First, the magnetic recording medium is cut perpendicularly to a main surface thereof, and a cross section thereof is observed with TEM. Subsequently, several hundreds of plate-shaped particles side surfaces (the thinnest surfaces of surfaces of the plate-shaped particles observed in the TEM image) of which can be observed are randomly selected from the observed TEM image, and the plate thickness T of each of these plate-shaped particles is determined. Subsequently, by simply averaging (arithmetically averaging) the obtained plate thicknesses T's of several hundreds of plate-shaped particles, the average plate thickness Tm is determined.

Measurement conditions of TEM are illustrated below.
Apparatus: TEM (H9000 NAR, manufactured by Hitachi, Ltd.)
Acceleration voltage: 300 kV
Magnification: 100000 times An average plate diameter Rm of the plate-shaped particles is determined as follows. First, the magnetic recording medium is cut perpendicularly to a main surface thereof, and a cross section thereof is observed with TEM. Subsequently, several hundreds of plate-shaped particles main surfaces (the largest surfaces of surfaces of the plate-shaped particles observed in the TEM image) of which can be observed are randomly selected from the observed TEM image, and a plate diameter R of each of these plate-shaped particles is determined. Subsequently, by simply averaging (arithmetically averaging) the determined plate diameters R's of several hundreds of plate-shaped particles, the average plate diameter Rm is determined.

Measurement conditions of TEM are illustrated below.
Apparatus: TEM (H9000 NAR, manufactured by Hitachi, Ltd.)
Acceleration voltage: 300 kV
Magnification: 100000 times A ratio (Rm/Tm) of the average plate diameter Rm of the plate-shaped particles to the average plate thickness Tm of the plate-shaped particles is determined using the average plate thickness Tm and the average plate diameter Rm of the plate-shaped particles determined as described above.

A ratio (Dm/Tm) of the average thickness Dm of the protective layer 12a to the average plate thickness Tm of the plate-shaped particles is preferably 30 or more and 500 or less, more preferably 60 or more and 500 or less, still more preferably 100 or more and 500 or less, and particularly preferably 200 or more and 500 or less. The ratio (Dm/Tm) of 30 or more can further improve dimensional stability of the magnetic recording medium against humidity change and tension. On the other hand, the ratio (Dm/Tm) of 500 or less can reduce the total thickness of the magnetic recording medium.

As the binder, a resin having a structure in which a crosslinking reaction is imparted to a polyurethane resin, a vinyl chloride resin, or the like is preferable. However, the binder is not limited to these resins, and other resins may be blended appropriately according to physical properties and the like required for the magnetic recording medium. Usually, a resin to be blended is not particularly limited as long as being generally used in an application type magnetic recording medium.

Examples of the resin to be blended include vinyl chloride, vinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacryate-ethylene copolymer, polyvinyl fluoride, a vinylidene chloride-alrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, and a synthetic rubber.

In addition, examples of a thermosetting resin or a reactive resin include a phenol resin, an epoxy resin, a urea resin, a melamine resin, an alkyd resin, a silicone resin, a polyamine resin, and a urea formaldehyde resin.

In addition, in order to improve dispersibility of magnetic powder, a polar functional group such as —$SO_3M$, —$OSO_3M$, —COOM, or P=$O(OM)_2$ may be introduced into each of the above binders. Herein, in the formulae, M represents a hydrogen atom or an alkali metal such as lithium, potassium, or sodium.

Furthermore, examples of the polar functional group include a side chain type group having a terminal group of —NR1R2 or —NR1R2R3+X—, and a main chain type group of >NR1R2+X—. Herein, in the formulae, R1, R2, and R3 each represent a hydrogen atom or a hydrocarbon group, and X— represents an ion of a halogen element such as fluorine, chlorine, bromine, or iodine, or an inorganic or organic ion. Furthermore, examples of the polar functional group include —OH, —SH, —CN, and an epoxy group.

Alternatively, a polyisocyanate may be used in combination with a resin to crosslink and harden the polyisocyanate. Examples of the polyisocyanate include toluene diisocyanate and an adduct thereof, and alkylene diisocyanate and an adduct thereof.

In a case where the protective layers 12a and 12b further contain an additive such as particle powder having a shape other than the plate-shaped particle powder or a pigment, a ratio of the plate-shaped particle powder to the total amount of the plate-shaped particle powder and the additive is preferably 90 Vol % or more from a viewpoint of improving dimensional stability of the magnetic recording medium against humidity change and tension.

(Base Layer)

The base layer 13 is a nonmagnetic layer containing nonmagnetic powder and a binder. The base layer 13 may further contain various additives such as conductive particles, a lubricant, an abrasive, a curing agent, and a rust inhibitor, if necessary.

The nonmagnetic powder may be made of an inorganic substance or an organic substance. In addition, carbon black and the like can also be used. Examples of the inorganic substance include a metal, a metal oxide, a metal carbonate, a metal sulfate, a metal nitride, a metal carbide, and a metal sulfide. Examples of the shape of the nonmagnetic powder include various shapes such as an acicular shape, a spherical shape, and a plate shape, but are not limited thereto.

The binder is similar to that in the above protective layers 12a and 12b.

As the conductive particles, fine particles mainly containing carbon, for example, carbon black can be used. Examples of the carbon black include Asahi #15 and #15HS manufactured by Asahi Carbon Co., Ltd. In addition, hybrid carbon in which carbon is attached to surfaces of silica particles may be used.

As the lubricant, for example, an ester of a monobasic fatty acid having 10 to 24 carbon atoms and any one of monohydric to hexahydric alcohols each having 2 to 12 carbon atoms, a mixed ester thereof, and a di- or tri-fatty acid ester can be used appropriately. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, and octyl myristate.

As the abrasive, for example, α-alumina having an a conversion ratio of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular a iron oxide obtained by dehydrating and annealing a raw material of magnetic iron oxide, and a product obtained by surface treatment thereof with aluminum and/or silica if necessary are used singly or in combination thereof.

(Recording Layer)

The recording layer 14 is, for example, a perpendicular recording layer capable of short wavelength recording or ultra short wavelength super recording. The recording layer 14 is a magnetic layer having magnetic anisotropy in a thickness direction of the recording layer 14. That is, an axis of easy magnetization of the recording layer 14 faces the thickness direction of the recording layer 14. The average thickness of the recording layer 14 is preferably 30 nm or more and 100 nm or less, and more preferably 50 nm or more and 70 nm or less. Note that the average thickness of the recording layer 14 is determined in a similar manner to the above average thickness Dm of each of the protective layers 12a and 12b.

The recording layer 14 is, for example, a magnetic layer containing magnetic powder and a binder. The recording layer 14 may further contain various additives such as conductive particles, a lubricant, an abrasive, a curing agent, and a rust inhibitor, if necessary.

The magnetic powder is cubic ferrite magnetic powder. Here, magnetic powder formed of cubic ferrite magnetic particles is referred to as cubic ferrite magnetic powder. In order to improve a recording density of the magnetic recording medium, the magnetic recording medium desirably has a high S/N ratio. Generally, it is desirable to design a particle size of magnetic powder as small as possible in consideration of increasing a coercive force Hc and suppressing noise in order to suppress self-demagnetization in recording demagnetization or short wavelength recording. Particularly in a vertically oriented film, higher output tends to be obtained as the coercive force Hc is higher due to an influence of a diamagnetic field. Furthermore, a higher coercive force also makes thermal stability excellent in a case of fine particles. Therefore, as a next generation magnetic recording medium, a magnetic recording medium having a high coercive force Hc is preferable. In consideration of this point, in this embodiment, cubic ferrite magnetic powder having a higher possibility of exhibiting a higher coercive force Hc than hexagonal barium ferrite magnetic powder is used.

The cubic ferrite magnetic powder has a cubic or substantially cubic shape. Herein, "the cubic ferrite magnetic powder has a substantially cubic shape" means that the cubic ferrite magnetic powder has a rectangular parallelepiped shape in which an average plate ratio (average aspect ratio (average plate diameter $L_{AM}$/average plate thickness $L_{BM}$)) of the cubic ferrite magnetic powder is 0.75 or more and 1.25 or less. The cubic ferrite magnetic powder has a small unit cell size, and therefore is advantageous from a viewpoint of being formed into ultrafine particles in the future.

The cubic ferrite magnetic powder is dispersed in the recording layer 14. The axis of easy magnetization of the cubic ferrite magnetic powder faces the thickness direction of the recording layer 14 or substantially faces the thickness direction of the recording layer 14. That is, the cubic ferrite magnetic powder is dispersed in the recording layer 14 such that a square surface thereof is perpendicular or almost perpendicular to the thickness direction of the recording layer 14. The cubic ferrite magnetic powder having a cubic or substantially cubic shape reduces a contact area between particles in a thickness direction of the medium as compared with hexagonal plate-shaped barium ferrite magnetic powder, and can suppress aggregation of the particles. That is, dispersibility of the magnetic powder can be enhanced.

The square surface of the cubic ferrite magnetic powder is preferably exposed from a surface of the recording layer 14. It is advantageous to perform short wavelength recording on this square surface with a magnetic head as compared with a case of performing short wavelength recording on a hexagonal surface of hexagonal plate-shaped barium ferrite magnetic powder having the same volume from a viewpoint of high density recording. The square surface of the cubic ferrite magnetic powder is preferably spread over the surface of the recording layer 14 from a viewpoint of high density recording.

Cubic ferrite magnetic particles are so-called spinel ferrimagnetic particles. The cubic ferrite magnetic particles are particles of iron oxide containing cubic ferrite as a main phase. The cubic ferrite contains at least one selected from the group consisting of Co, Ni, Mn, Al, Cu, and Zn. Preferably, the cubic ferrite contains at least Co, and further contains, in addition to Co, one or more selected from the group consisting of Ni, Mn, Al, Cu, and Zn. More specifically, for example, the cubic ferrite has an average composition represented by a general formula $MFe_2O_4$. However, M is one or more metals selected from the group consisting of Co, Ni, Mn, Al, Cu, and Zn. Preferably, M is a combination of Co and one or more metals selected from the group consisting of Ni, Mn, Al, Cu, and Zn.

An average plate diameter (average particle size) of the cubic ferrite magnetic powder is preferably 14 nm or less, and more preferably 10 nm or more and 14 nm or less. The average plate diameter of more than 14 nm increases an exposed area of particles on a surface of the medium, and may reduce an S/N ratio. On the other hand, the average plate diameter of less than 10 nm may make it difficult to manufacture the cubic ferrite magnetic powder.

An average plate ratio (average aspect ratio (average plate diameter $L_{AM}$/average plate thickness $L_{BM}$)) of the cubic ferrite magnetic powder is preferably 0.75 or more and 1.25 or less. The average plate shape outside this numerical range makes the shape of the cubic ferrite magnetic powder not cubic or substantially cubic, therefore causes aggregation, and may make short wavelength recording difficult.

The binder is similar to that in the above protective layers 12a and 12b.

The conductive particles, the lubricant, and the abrasive are similar to those of the base layer 13 described above.

As nonmagnetic reinforcing particles, the recording layer 14 may further contain aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Back Coat Layer)

The back coat layer 15 contains a binder, inorganic particles, and a lubricant. The back coat layer 15 may contain various additives such as a curing agent and an antistatic agent, if necessary. The binder, the inorganic particles, and the lubricant are similar to those of the base layer 13 described above.

[2. Method for Manufacturing Magnetic Recording Medium]

Next, an example of a method for manufacturing a magnetic recording medium having the above configuration will be described.

(Step of Adjusting Coating Material)

First, by kneading and dispersing plate-shaped particle powder, a binder, and the like in a solvent, a protective layer-forming coating material is prepared. Subsequently, by kneading and dispersing nonmagnetic powder, a binder, and the like in a solvent, a base layer-forming coating material is prepared. Subsequently, by kneading and dispersing magnetic powder, a binder, and the like in a solvent, a recording layer-forming coating material is prepared. Subsequently, by kneading and dispersing a binder, inorganic particles, a lubricant, and the like in a solvent, a back coat layer-forming coating material is prepared. For example, the following solvents, dispersing apparatuses, and kneading apparatuses can be applied to preparation of the protective layer-forming coating material, the base layer-forming coating material, the recording layer-forming coating material, and the back coat layer-forming coating material.

Examples of the solvent used for preparing the above coating material include ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, and halogenated hydrocarbon solvents such as methylene chloride, ethylene chloride, carbon tetrachloride, chloroform, and chlorobenzene. These solvents may be used singly, or may be used in a mixture thereof appropriately.

Examples of the kneading apparatus used for preparing the above coating material include kneading apparatuses such as a continuous twin-screw kneading machine, a continuous twin-screw kneading machine capable of performing dilution in multiple stages, a kneader, a pressure kneader, and a roll kneader, but are not particularly limited to these apparatuses. In addition, examples of the dispersing apparatus used for preparing the above coating material include dispersing apparatuses such as a roll mill, a ball mill, a horizontal sand mill, a vertical sand mill, a spike mill, a pin mill, a tower mill, a pearl mill (for example, "DCP mill" manufactured by Eirich Co., Ltd.), a homogenizer, and an ultrasonic wave dispersing machine, but are not particularly limited to these apparatuses.

(Step of Forming Protective Layer)

Subsequently, a protective layer-forming coating material is applied onto one main surface of the strip-shaped nonmagnetic support 11 to form a coating film. When the protective layer-forming coating material is applied onto one main surface of the nonmagnetic support 11, plate-shaped particle powder contained in the coating film is spontaneously oriented such that main surfaces of the plate-shaped particles face one main surface of the nonmagnetic support 11 and the plate-shaped particle powder is stacked in an overlapping manner in a thickness direction of the protective layer 12a. That is, the plate-shaped particle powder is oriented such that a short axis of the plate-shaped particle powder contained in the protective layer 12a is substantially parallel to the thickness direction of the protective layer 12a. However, the plate-shaped particle powder contained in the coating film may be oriented in a magnetic field, if necessary. Subsequently, by drying the coating film, the protective layer 12a is formed on one main surface of the nonmagnetic support 11.

Subsequently, the protective layer 12b is formed on the other main surface of the nonmagnetic support 11 in a similar manner to the above step of forming the protective layer 12a except that the protective layer-forming coating material is applied onto the other main surface of the strip-shaped nonmagnetic support 11.

(Step of Forming Base Layer)

Subsequently, by applying abase layer-forming coating material onto the protective layer 12a formed on one main surface of the nonmagnetic support 11 and drying the base layer-forming coating material, the base layer 13 is formed on the protective layer 12a.

(Step of Forming Recording Layer)

Subsequently, by applying a recording layer-forming coating material onto the base layer 13 and drying the recording layer-forming coating material, the recording layer 14 is formed on the base layer 13. Incidentally, in drying, by orienting cubic ferrite magnetic powder contained in magnetic powder in a magnetic field, an axis of easy magnetization of the cubic ferrite magnetic powder is preferably oriented in a thickness direction of the recording layer 14 or substantially in the thickness direction of the recording layer 14.

(Step of Forming Back Coat Layer)

Subsequently, by applying a back coat layer-forming coating material onto the protective layer 12b formed on the other main surface of the nonmagnetic support 11 and drying the back coat layer-forming coating material, the back coat layer 15 is formed. A wide magnetic recording medium is thereby obtained.

(Step of Calendering Treatment and Cutting)

Subsequently, the obtained wide magnetic recording medium is rewound around a large-diameter core and is cured. Subsequently, the wide magnetic recording medium is calendered, and then is cut into a predetermined width. A target magnetic recording medium is thereby obtained. Note that the step of forming the back coat layer 15 may be performed after the calendering treatment.

[3. Effect]

In the magnetic recording medium according to the embodiment of the present technology, the protective layers 12a and 12b each containing plate-shaped particle powder are provided on both surfaces of the nonmagnetic support 11. This plate-shaped particle powder is stacked in an overlapping manner in a thickness direction of the protective layers 12a and 12b such that main surfaces of plate-shaped particles face a main surface of the nonmagnetic support 11, and the plate-shaped particles have an average plate ratio of 60 or more. As a result, moisture hardly reaches the nonmagnetic support 11, and therefore dimensional stability against humidity change can be improved. Furthermore, in both the longitudinal direction and the width direction, deformation against tension and compression hardly occurs, and a Poisson's ratio can be reduced, and therefore tension deformation can be reduced.

By providing the protective layers 12a and 12b on both surfaces of the nonmagnetic support 11, even in a magnetic recording medium requiring high performance, a general polymer resin material such as polyethylene (PE) can be used as a material of the nonmagnetic support 11. Therefore, manufacturing cost of the magnetic recording medium can be reduced.

[4. Modification Example]

In the above embodiment, the configuration in which the protective layers 12a and 12b are provided on both surfaces of the nonmagnetic support 11 has been described as an example. However, a configuration in which a protective layer is provided on at least one main surface of the nonmagnetic support 11 or on one of the main surfaces of the nonmagnetic support 11 maybe adopted. In a case where a protective layer is provided on one of main surfaces of the nonmagnetic support 11, the protective layer is preferably provided on the opposite main surface to the recording layer 14 of both main surfaces of the nonmagnetic support 11 from a viewpoint of improvement in dimensional stability against humidity change and tension.

The protective layer in the above embodiment may be provided on one of main surfaces of the nonmagnetic support 11, and a general protective layer may be provided on the other main surface. Furthermore, the protective layer in the above embodiment and the general protective layer may be stacked and used. Herein, the general protective layer means a protective layer used for the purpose of dimensional stability in the technical field of the magnetic recording medium. Examples of the general protective film include a thin film formed by vapor deposition or a technique for manufacturing a vacuum thin film such as a sputtering film. Specific examples of the general protective film include reinforcing layers of Patent Documents 1 and 2.

In the above embodiment, the case where the magnetic recording medium is a perpendicular magnetic recording medium has been described as an example, but the magnetic recording medium may be a horizontal magnetic recording medium.

In the above embodiment, the example of using the cubic ferrite magnetic powder as the magnetic powder contained in the recording layer has been described. However, the magnetic powder is not limited to this example, and magnetic powder generally used in the perpendicular magnetic recording medium or the horizontal magnetic recording medium can be used. Specific examples of the magnetic powder include Fe-based and Fe—Co based metal powder, barium ferrite, iron carbide, and iron oxide. Note that as an auxiliary element, a metal compound of Co, Ni, Cr, Mn, Mg, Ca, Ba, Sr, Zn, Ti, Mo, Ag, Cu, Na, K, Li, Al, Si, Ge, Ga, Y, Nd, La, Ce, Zr, or the like may coexist.

In the above embodiment, the example in which the base layer 13 and the recording layer 14 are thin films manufactured by an application step (wet process) has been described. However, the base layer 13 and the recording layer 14 may be thin films formed by a technique for manufacturing a vacuum thin film (dry process) such as sputtering.

The steps of forming the protective layer 12a and the base layer 13 are not limited to the above examples. For example, by applying a protective layer-forming coating material onto one main surface of the nonmagnetic support 11 to form a coating film, applying a base layer-forming coating material on the coating film in a wet state in an overlapping manner to form a coating film, and then drying both the coating films, the protective layer 12a and the base layer 13 may be formed on one main surface of the nonmagnetic support 11.

The steps of forming the base layer 13 and the recording layer 14 are not limited to the above examples. For example, by applying a base layer-forming coating material onto one main surface of the protective layer 12a to form a coating film, applying a recording layer-forming coating material on the coating film in a wet state in an overlapping manner to form a coating film, and then drying both the coating films, the base layer 13 and the recording layer 14 may be formed on one main surface of the protective layer 12a. Note that the steps of forming the base layer 13 and the recording layer 14 maybe combined with Modification Example of the above steps of forming the protective layer 12a and the base layer 13.

In the above embodiment, the configuration in which the base layer 13 is provided between the protective layer 12a and the recording layer 14 has been described as an example. However, the base layer 13 is provided if necessary, and a configuration in which the base layer 13 is not provided may be adopted. In addition, the configuration in which the back coat layer 15 is provided on the protective layer 12b has been described as an example. However, the back coat layer 15 is provided if necessary, and a configuration in which the back coat layer 15 is not provided may be adopted.

EXAMPLES

Hereinafter, the present technology will be described specifically with Examples, but the present technology is not limited only to these Examples.

(Average Thickness Dm of Protective Layer)

In this Example, an average thickness Dm of a protective layer was determined as described in the above embodiment.

(Average Thicknesses of Base Layer and Recording Layer)

In this Example, average thicknesses of a base layer and a recording layer were determined in a similar manner to the above "average thickness Dm of protective layer".

(Average Plate Thickness Tm of Plate-Shaped Particle Powder)

In this Example, an average plate thickness Tm of plate-shaped particle powder was determined as described in the above embodiment.

(Average Plate Diameter Rm of Plate-Shaped Particle Powder)

In this Example, an average plate diameter Rm of plate-shaped particle powder was determined as described in the above embodiment.

(Average Plate Ratio Rm/Tm of Plate-Shaped Particle Powder)

In this Example, an average plate ratio Rm/Tm of plate-shaped particle powder was determined as described in the above embodiment.

(Ratio Dm/Tm of Plate-Shaped Particle Powder)

In this Example, a ratio (Dm/Tm) of the average thickness Dm of a protective layer to the average plate thickness Tm of the plate-shaped particle powder was determined as described in the above embodiment.

(Average Short Axis Diameter Tm of Acicular Particle Powder)

In this Example, an average short axis diameter Tm of acicular particles was determined in a similar manner to the above "average plate thickness Tm of plate-shaped particle powder" except that short axis diameters T's of several hundreds of acicular particles were determined from a cross-sectional TEM image and were simply averaged (arithmetically averaged).

(Average Long Axis Diameter Rm of Acicular Particle Powder)

In this Example, an average long axis diameter Rm of acicular particles was determined in a similar manner to the above "average plate diameter Rm of plate-shaped particle powder" except that long axis diameters R's of several hundreds of acicular particles were determined from a cross-sectional TEM image and were simply averaged (arithmetically averaged).

(Average Acicular Ratio Rm/Tm of Acicular Particle Powder)

In this Example, an average acicular ratio Rm/Tm of acicular particle powder was determined using the average short axis diameter Tm and the average long axis diameter Rm of acicular particles determined as described above.

(Ratio Dm/Tm of Acicular Particle Powder)

In this Example, a ratio (Dm/Tm) of the average thickness Dm of a protective layer to the average short axis diameter Tm of acicular particle powder was determined using the average short axis diameter Tm of acicular particles and the average thickness Dm of the protective layer determined as described above.

(Average Particle Diameter Tm of Spherical Particle Powder)

In this Example, an average diameter Tm (=Rm) of spherical particles was determined in a similar manner to the above "average plate thickness Tm of plate-shaped particle powder" except that diameters T's of several hundreds of spherical particles were determined from a cross-sectional TEM image and were simply averaged (arithmetically averaged).

(Ratio Dm/Tm of Spherical Particle Powder)

In this Example, a ratio (Dm/Tm) of the average thickness Dm of a protective layer to the average diameter Tm of spherical particle powder was determined using the average particle diameter Tm of spherical particles and the average thickness Dm of the protective layer determined as described above.

Example 1

(Step of Preparing Recording Layer-Forming Coating Material)

A recording layer-forming coating material was prepared as follows. First, the following raw materials were kneaded with an extruder to obtain a kneaded product.

CoNi ferrite crystal magnetic powder: 100 parts by mass
(Shape: substantially cubic shape, average plate diameter: 11 nm, average plate ratio: 0.95)
Vinyl chloride resin (cyclohexanone solution 30% by mass): 55.6 parts by mass
(Degree of polymerization: 300, Mn=10000, $OSO_3K$=0.07 mmol/g and secondary OH=0.3 mmol/g were contained as polar groups)
Aluminum oxide powder: 5 parts by mass
($\alpha$-$Al_2O_3$, average particle diameter: 0.2 μm)
Carbon black: 2 parts by mass
(Manufactured by Tokai Carbon Co., Ltd., trade name: Seast TA)

Subsequently, the kneaded product and the following raw materials were put in a stirring tank equipped with a disper, and were premixed. Thereafter, the mixture was further subjected to sand mill mixing, and was subjected to a filter treatment to prepare a recording layer-forming coating material.

Vinyl chloride resin: 27.8 parts by mass
(Resin solution: resin content 30% by mass, cyclohexanone 70% by mass)
Polyisocyanate: 4 parts by mass
(Trade name: Coronate L, manufactured by Nippon Polyurethane Industry Co., Ltd.)
Myristic acid: 2 parts by mass
N-Butyl stearate: 2 parts by mass
Methyl ethyl ketone: 121.3 parts by mass
Toluene: 121.3 parts by mass
Cyclohexanone: 60.7 parts by mass (Step of Preparing Base Layer-Forming Coating Material)

A base layer-forming coating material was prepared as follows. First, the following raw materials were kneaded with an extruder to obtain a kneaded product.

Acicular iron oxide powder: 100 parts by mass ($\alpha$-$Fe_2O_3$, average long axis length 0.15 μm)
Vinyl chloride resin: 55.6 parts by mass
(Resin solution: resin content 30% by mass, cyclohexanone 70% by mass)
Carbon black: 10 parts by mass
(Average particle diameter 20 nm)

Subsequently, the kneaded product and the following raw materials were put in a stirring tank equipped with a disper, and were premixed. Thereafter, the mixture was further subjected to sand mill mixing, and was subjected to a filter treatment to prepare a base layer-forming coating material.

Polyurethane resin UR8200 (manufactured by Toyobo Co., Ltd.): 18.5 parts by mass
Polyisocyanate: 4 parts by mass
(Trade name: Coronate L, manufactured by Nippon Polyurethane Industry Co., Ltd.)
Myristic acid: 2 parts by mass
N-Butyl stearate: 2 parts by mass
Methyl ethyl ketone: 108.2 parts by mass
Toluene: 108.2 parts by mass
Cyclohexanone: 18.5 parts by mass (Step of Preparing Protective Layer-Forming Coating Material)

A protective layer-forming coating material was prepared as follows. The following raw materials were mixed in a stirring tank equipped with a disper, and were subjected to a filter treatment to prepare a protective layer-forming coating material.

Barium ferrite: 100 parts by mass
(Shape: plate shape, average plate ratio Rm/Tm: 60, average plate thickness Tm: 4 nm, average plate diameter Rm: 240)
Polyurethane resin UR8200 (manufactured by Toyobo Co., Ltd.): 25 parts by mass
(Degree of polymerization: 300, Mn=10000, $OSO_3K$=0.07 mmol/g and secondary OH=0.3 mmol/g were contained as polar groups)
Methyl ethyl ketone: 250 parts by mass
Toluene: 2000 parts by mass (Step of Preparing Back Coat Layer-Forming Coating Material)

A back coat layer-forming coating material was prepared as follows. The following raw materials were mixed in a stirring tank equipped with a disper, and were subjected to filter treatment to prepare a back coat layer-forming coating material.

Carbon black (manufactured by Asahi Corporation, trade name: #80): 100 parts by mass
Polyester polyurethane: 100 parts by mass
(Trade name: N-2304, manufactured by Nippon Polyurethane Industry Co., Ltd.)
Methyl ethyl ketone: 500 parts by mass
Toluene: 400 parts by mass
Cyclohexanone: 100 parts by mass (Step of Forming Protective Layer, Base Layer, and Recording Layer)

Subsequently, a protective layer, a base layer, and a recording layer were formed as follows. First, by applying a protective layer-forming coating material onto one main surface of a strip-shaped PEN film having a thickness of 6.2 µm as a nonmagnetic support, and drying the protective layer-forming coating material, a protective layer having an average thickness of 150 nm was formed on one main surface of the PEN film. Subsequently, by applying a base layer-forming coating material onto the protective layer and drying the base layer-forming coating material, a base layer having an average thickness of 1 µm was formed on the protective layer. Subsequently, by applying a recording layer-forming coating material onto the base layer and drying the recording layer-forming coating material, a recording layer having an average thickness of 70 nm was formed on the base layer. Note that magnetic powder was oriented in a magnetic field during drying.

(Step of Forming Back Coat Layer)

Subsequently, by applying a back coat layer-forming coating material onto the other main surface of the PEN film and drying the back coat layer-forming coating material, a back coat layer having an average thickness of 0.6 µm was formed on the other main surface of the PEN film. As a result, a wide magnetic tape was obtained.

(Step of Calendering Treatment and Cutting)

Subsequently, the obtained wide magnetic tape was calendered with a metal roll to smoothen a surface of the recording layer. Subsequently, the wide magnetic tape was cut into a width of ½ inch (12.65 mm) to obtain a target magnetic tape.

Example 2

In the step of preparing a protective layer-forming coating material, α-iron oxide (shape:plate shape, average plate ratio Rm/Tm: 60, average plate thickness Tm: 10 nm, average plate diameter Rm: 600 nm) was used in place of barium ferrite. Furthermore, in the step of forming a protective layer, the average thickness of a protective layer was changed to 300 nm. A magnetic tape was obtained in a similar manner to Example 1 except for this.

Example 3

In the step of preparing a protective layer-forming coating material, mica (shape: plate shape, average plate ratio Rm/Tm: 200, average plate thickness Tm: 5 nm, average plate diameter Rm: 1000 nm) was used in place of barium ferrite. A magnetic tape was obtained in a similar manner to Example 1 except for this.

Example 4

In the step of preparing a protective layer-forming coating material, montmorillonite (shape: plate shape, average plate ratio Rm/Tm: 300, average plate ratio Tm: 1 nm, average plate diameter Rm: 300 nm) was used in place of barium ferrite. A magnetic tape was obtained in a similar manner to Example 1 except for this.

Example 5

In the step of preparing a protective layer-forming coating material, montmorillonite (shape: plate shape, average plate ratio Rm/Tm: 300, average plate ratio Tm: 2 nm, average plate diameter Rm: 600 nm) was used. Furthermore, in the step of forming a protective layer, the average thickness of the protective layer was changed to 40 nm. A magnetic tape was obtained in a similar manner to Example 4 except for this.

Example 6

In the step of forming a protective layer, a protective layer having an average thickness of 250 nm was formed on both surfaces of the PEN film. Furthermore, in the step of forming a base layer, the average thickness of the base layer was changed to 0.6 µm. A magnetic tape was obtained in a similar manner to Example 4 except for this.

Example 7

In the step of forming a protective layer, a protective layer having an average thickness of 100 nm was formed on both surfaces of the PEN film. A magnetic tape was obtained in a similar manner to Example 4 except for this.

Comparative Example 1

A base layer was directly formed on one main surface of the PEN film without forming a protective layer. A magnetic tape was obtained in a similar manner to Example 1 except for this.

Comparative Example 2

In the step of preparing a protective layer-forming coating material, barium ferrite (shape: plate shape, average plate ratio Rm/Tm: 7, average plate thickness Tm: 4 nm, average plate diameter Rm: 28 nm) was used. Furthermore, in the step of forming a protective layer, the average thickness of the protective layer was changed to 120 nm. A magnetic tape was obtained in a similar manner to Example 1 except for this.

Comparative Example 3

In the step of preparing a protective layer-forming coating material, α-iron oxide (shape: acicular, average acicular ratio Rm/Tm: 10, average short axis diameter Tm: 8 nm, average long axis diameter Rm: 80) was used in place of barium ferrite. Furthermore, in the step of forming a protective layer, the average thickness of the protective layer was changed to 250 nm. A magnetic tape was obtained in a similar manner to Example 1 except for this.

Comparative Example 4

In the step of preparing a protective layer-forming coating material, silica (shape: spherical, average particle diameter Tm: 18 nm) was used in place of barium ferrite. In addition, in the step of forming a protective layer, a protective layer having an average thickness of 250 nm was formed on both surfaces of the PEN film. A magnetic tape was obtained in a similar manner to Example 1 except for this.

Comparative Example 5

In the step of preparing a protective layer-forming coating material, α-iron oxide (shape: plate shape, average plate ratio Rm/Tm: 50, average plate thickness Tm: 10 nm, average plate diameter Rm: 500 nm) was used in place of barium ferrite. Furthermore, in the step of forming a protective layer, the average thickness of the protective layer was changed to 300 nm. A magnetic tape was obtained in a similar manner to Example 1 except for this.

(Evaluation)

The magnetic tapes obtained as described above were evaluated as follows.

(Presence or Absence of Particle Overlap)

First, a magnetic tape was cut perpendicularly to a main surface thereof, and a cross section thereof was observed with TEM. Subsequently, from the observed TEM image, it was judged whether plate-shaped particle powder contained in a protective layer was stacked in an overlapping manner in a thickness direction of the protective layer such that main surfaces of plate-shaped particles faced a main surface of a PEN film (nonmagnetic support). Table 1 illustrates results thereof. Note that this evaluation was performed only on a sample using plate-shaped particle powder as particle powder of the protective layer.

Measurement conditions of TEM are illustrated below.
Apparatus: TEM (H9000 NAR, manufactured by Hitachi, Ltd.)
Acceleration voltage: 300 kV
Magnification: 100000 times (Young's Modulus)

Measurement was performed at sample width of 6.25 mm×sample execution length of 100 mm and a pulling speed of 200 mm/min on the basis of JIS-K 7133, ASTM D 882, and a value obtained by dividing a tensile stress giving 1% elongation by an initial film cross-sectional area was used as E (Young's modulus). Table 1 illustrates results thereof.

(Humidity Deformation Ratio)

From deformation in a width direction when a constant load was applied in a longitudinal direction of a sample and humidity was changed at 25° C., a humidity expansion ratio was calculated according to the following formula (1). Table 1 illustrates results thereof. A sample with a width of ½ inches and a marked line interval of 200 mm was used. The load was 20 g in a longitudinal direction of the sample.

$$\text{Humidity expansion ratio}(\%) = [(L-L_0)/12.65] \times 100 \quad (1)$$

However, $L_0$ represents a marked line interval (mm) when the sample was stored at 25° C. at RH 20% for 24 hours.

In addition, L indicates a marked line interval (mm) when the sample was stored at 25° C. at RH 80% for 24 hours.

Table 1 illustrates configurations and evaluation results of magnetic tapes in Examples 1 to 7 and Comparative Examples 1 to 5.

TABLE 1

| | Particle shape Rm/Tm | Tm [nm] | Rm [nm] | Average thickness of protective layer, Surface A/Surface B [nm] | Thickness of base layer [µm] | Ratio Dm/Tm | Type of particle | Presence or absence of particle overlap | Young's modulus [Kg/mm²] | Humidity deformation ratio [ppm/Rh %] |
|---|---|---|---|---|---|---|---|---|---|---|
| Example 1 | Plate-shaped Average plate ratio 60 | 4 | 240 | 150/0 | 1.0 | 37.5 | Barium ferrite | Present | 5500/8600 | 4.8 |
| Example 2 | Plate-shaped Average plate ratio 60 | 10 | 600 | 300/0 | 1.0 | 30 | α-Iron oxide | Present | 5500/8400 | 5.0 |
| Example 3 | Plate-shaped Average plate ratio 200 | 5 | 1000 | 150/0 | 1.0 | 30 | Mica | Present | 5600/8700 | 4.6 |
| Example 4 | Plate-shaped Average plate ratio 300 | 1 | 300 | 150/0 | 1.0 | 150 | Montmorillonite | Present | 5700/8800 | 4.5 |
| Example 5 | Plate-shaped Average plate ratio 300 | 2 | 600 | 40/0 | 1.0 | 20 | Montmorillonite | Present | 5300/8500 | 6.4 |
| Example 6 | Plate-shaped Average plate ratio 300 | 1 | 300 | 250/250 | 0.6 | 250 | Montmorillonite | Present | 7300/10600 | 3.0 |
| Example 7 | Plate-shaped Average plate ratio 300 | 1 | 300 | 100/100 | 1.0 | 100 | Montmorillonite | Present | 6000/9000 | 4.1 |
| Comparative Example 1 | No protective layer | — | — | 0/0 | 0.0 | 0 | — | — | 5200/8400 | 7.3 |
| Comparative Example 2 | Plate-shaped Average plate ratio 7 | 4 | 28 | 1200/0 | 1.0 | 30 | Barium ferrite | Present | 5200/8400 | 7.0 |
| Comparative Example 3 | Acicular Average acicular ratio 10 | 8 | 80 | 250/0 | 1.0 | 31.25 | α-Iron oxide | — | 5200/8400 | 7.3 |
| Comparative Example 4 | Spherical | 18 | — | 250/250 | 1.0 | 13.9 | Silica | — | 5200/8400 | 7.0 |
| Comparative Example 5 | Plate-shaped Average plate ratio 50 | 10 | 500 | 300/0 | 1.0 | 30 | α-Iron oxide | Present | 5200/8400 | 6.0 |

Surface A: a surface on which a recording layer is formed of both surfaces of a PEN film (nonmagnetic support)

Surface B: a back surface opposite to the recording layer forming side of both surfaces of a PEN film (nonmagnetic support)

MD: Machine Direction

TD: Transverse Direction

Dm: average thickness of protective layer

Tm: In a case where a particle shape is plate-shaped, Tm means an average plate thickness. In a case where a particle shape is acicular, Tm means an average short axis diameter. In a case where a particle shape is spherical, Tm means an average diameter.

Rm: In a case where a particle shape is plate-shaped, Rm means an average plate diameter. In a case where a particle shape is acicular, Rm means an average long axis diameter.

From the evaluation results and the like of Example 1 and Comparative Examples 1 and 5, it is found that an effect of suppressing dimensional deformation against humidity change and tension (hereinafter referred to as "effect of suppressing dimensional deformation") can be obtained in a case where plate-shaped particle powder is stacked in an overlapping manner in a thickness direction of a protective layer such that main surfaces of plate-shaped particles face a main surface of a support, and the plate-shaped particle powder has an average plate ratio of 60 or more.

From the evaluation results and the like of Examples 1, 3, and 4 and Comparative Example 5, it is found that the effect of suppressing dimensional deformation is better as the average plate ratio of the plate-shaped particles is larger.

From the evaluation results and the like of Comparative Examples 1, 3, and 4, it is found that it is difficult to obtain the effect of suppressing dimensional deformation in a case where the particles contained in a protective layer are acicular particle powder or spherical particle powder.

From the evaluation results and the like of Examples 1 to 4, it is found that the effect of suppressing dimensional deformation is exhibited regardless of the type of plate-shaped particle powder in a case where the plate-shaped particle powder is stacked in an overlapping manner in a thickness direction of a protective layer such that main surfaces of plate-shaped particles face a main surface of a support, and the plate-shaped particle powder has an average plate ratio of 60 or more.

From the evaluation results and the like of Examples 4 and 5, it is found that the effect of suppressing dimensional deformation is better as the ratio (Dm/Tm) of the average thickness Dm of a protective layer to the average plate thickness Tm of plate-shaped particles is larger.

From the evaluation results and the like of Examples 4 to 7, it is found that provision of a protective layer on both surfaces of a nonmagnetic support improves the effect of suppressing dimensional deformation.

Hereinabove, the embodiment of the present technology, Modification Example thereof, and Examples have been described specifically. However, the present technology is not limited to the above embodiment, Modification Example thereof, and Example, and various modifications based on a technical idea of the present technology can be made.

For example, the configurations, the methods, the steps, the shapes, the materials, the numerical values, and the like exemplified in the above embodiment, Modification Example thereof, and Examples are only examples, and a configuration, a method, a step, a shape, a material, a numerical value, and the like different therefrom may be used, if necessary.

In addition, the configurations, the methods, the steps, the shapes, the materials, the numerical values, and the like in the above embodiment, Modification Example thereof, and Examples can be combined to each other as long as not departing from the gist of the present technology.

It should be understood that various changes and modifications to the presently preferred embodiments described herein will be apparent to those skilled in the art. Such changes and modifications can be make without departing from the spirit and scope of the present subject matter and without diminishing its intended advantages. It is therefore intended that such changes and modifications be covered by the appended claims.

In addition, the present technology can adopt the following configurations.

(1) A magnetic recording medium including:

a support;

a recording layer; and a protective layer provided on at least one surface of the support and containing plate-shaped particle powder, in which the plate-shaped particle powder is stacked in an overlapping manner in a thickness direction of the protective layer such that main surfaces of the plate-shaped particles face a surface of the support, and the plate-shaped particles have an average plate ratio of 60 or more.

(2) The magnetic recording medium according to (1), in which the plate-shaped particles have an average plate ratio of 200 or more.

(3) The magnetic recording medium according to (1) or (2), in which a ratio (Dm/Tm) of an average thickness Dm of the protective layer to an average plate thickness Tm of the plate-shaped particles is 30 or more.

(4) The magnetic recording medium according to any one of (1) to (3), in which the protective layer is provided on a surface opposite to the recording layer of both surfaces of the support.

(5) The magnetic recording medium according to any one of (1) to (3), in which the protective layer is provided on both surfaces of the support.

(6) The magnetic recording medium according to any one of (1) to (5), in which the plate-shaped particles are made of clay.

(7) The magnetic recording medium according to (6), in which the clay is at least one selected from the group consisting of kaolinite, dickite, halloysite, chrysotile, lizardide, amesite, pyrophyllite, talc, montmorillonite, beidellite, nontronite, stevensite, saponite, hectorite, sauconite, dioctahedral vermiculite, trioctahedral vermiculite, muscovite, paragonite, illite, sericite, phlogopite, biotite, lepidolite, magadiite, irilite, and kanemite.

(8) The magnetic recording medium according to any one of (1) to (5), in which the plate-shaped particles are made of ferrite.

(9) The magnetic recording medium according to any one of (1) to (8), further including a base layer provided under the recording layer.

REFERENCE SIGNS LIST

11 Nonmagnetic support
12*a*, 12*b* Protective layer
13 Base layer
14 Recording layer
15 Back coat layer

The invention claimed is:

1. A magnetic recording medium comprising:
   a support;
   a recording layer; and
   a protective layer provided on at least one surface of the support and containing plate-shaped particles, wherein
   the plate-shaped particles are stacked on main surfaces of the plate-shaped particles in an overlapping manner in a thickness direction of the protective layer, and the main surfaces of the plate-shaped particles face a top surface of the support, and
   the plate-shaped particles have an average plate ratio, and the average plate ratio of an average minimum diameter of the main surfaces of the plate-shaped particles to an average thickness of the plate-shaped particles is 60 or more.

2. The magnetic recording medium according to claim 1, wherein the average plate ratio of the plate-shaped particles is 200 or more.

3. The magnetic recording medium according to claim 1, wherein a ratio (Dm/Tm) of an average thickness Dm of the protective layer to an average plate thickness Tm of the plate-shaped particles is 30 or more.

4. The magnetic recording medium according to claim 1, wherein the protective layer is provided on a surface opposite to the recording layer of both surfaces of the support.

5. The magnetic recording medium according to claim 1, wherein the protective layer is provided on both surfaces of the support.

6. The magnetic recording medium according to claim 1, wherein the plate-shaped particles include clay.

7. The magnetic recording medium according to claim 6, wherein the clay is at least one selected from the group consisting of kaolinite, dickite, halloysite, chrysotile, lizardide, amesite, pyrophyllite, talc, montmorillonite, beidellite, nontronite, stevensite, saponite, hectorite, sauconite, dioctahedral vermiculite, trioctahedral vermiculite, muscovite, paragonite, illite, sericite, phlogopite, biotite, lepidolite, magadiite, irilite, and kanemite.

8. The magnetic recording medium according to claim 1, wherein the plate-shaped particles include ferrite.

9. The magnetic recording medium according to claim 1, further comprising a base layer provided under the recording layer.

10. The magnetic recording medium according to claim 1, further comprising a back coat layer on an opposite side to the recording layer, wherein the back coat layer is provided on the protective layer.

* * * * *